United States Patent
Risbeck et al.

(10) Patent No.: US 12,265,366 B1
(45) Date of Patent: Apr. 1, 2025

(54) BUILDING SYSTEM WITH SYNTHETIC DATA COMPLIANCE CONTROL

(71) Applicant: Tyco Fire & Security GmbH, Neuhausen am Rheinfall (CH)

(72) Inventors: Michael J. Risbeck, Madison, WI (US); Shawn D. Schubert, Oak Creek, WI (US); Jonathan D. Douglas, Mequon, WI (US); Charles Gans, Phoenixville, PA (US); Bernard P. Clement, Mequon, WI (US); Young M. Lee, Old Westbury, NY (US); Edward Gerard McNamara, Old Pallas (IE); Brennan H. Fentzlaff, Oconomowoc, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 0 days.

(21) Appl. No.: 18/244,779

(22) Filed: Sep. 11, 2023

(51) Int. Cl.
*G05B 19/042* (2006.01)

(52) U.S. Cl.
CPC .. *G05B 19/042* (2013.01); *G05B 2219/25011* (2013.01)

(58) Field of Classification Search
USPC .......................................................... 700/28
See application file for complete search history.

(56) References Cited

U.S. PATENT DOCUMENTS

| 10,310,477 | B2 | 6/2019 | Sinha et al. |
| 10,677,484 | B2 | 6/2020 | Ribbich et al. |
| 10,907,844 | B2 | 2/2021 | Ribbich et al. |
| 11,232,358 | B1* | 1/2022 | Ramezani ............. G06F 40/216 |
| 11,269,306 | B2 | 3/2022 | Risbeck et al. |
| 11,281,173 | B2 | 3/2022 | Turney et al. |
| 11,415,334 | B2 | 8/2022 | Turney et al. |
| 11,525,596 | B2 | 12/2022 | Lee et al. |
| 2017/0075510 | A1 | 3/2017 | Bentz et al. |
| 2017/0234562 | A1 | 8/2017 | Ribbich et al. |
| 2018/0266718 | A1 | 9/2018 | Gillette et al. |
| 2020/0162354 | A1* | 5/2020 | Drees ....................... G06N 7/01 |

(Continued)

FOREIGN PATENT DOCUMENTS

CN 112733246 A 4/2021

OTHER PUBLICATIONS

Tsialiamanis, George, et al. "On generative models as the basis for digital twins." Data-Centric Engineering 2 (2021): e11. (Year: 2021).*

(Continued)

*Primary Examiner* — Mohammad Ali
*Assistant Examiner* — Joshua T Sanders
(74) *Attorney, Agent, or Firm* — Foley & Lardner LLP

(57) ABSTRACT

A method for controlling building equipment includes generating building data relating to conditions in a building space using a generative artificial intelligence model. The method also includes determining whether the building data correspond to conditions in the building space that comply with one or more regulations or certification standards. The method includes, in response to determining that the building data correspond to conditions in the building space that comply with the one or more regulations or certification standards, using the building data to operate building equipment that serve the building space.

20 Claims, 10 Drawing Sheets

(56) References Cited

U.S. PATENT DOCUMENTS

| | | | |
|---|---|---|---|
| 2021/0010701 A1 | 1/2021 | Nesler et al. | |
| 2021/0080139 A1 | 3/2021 | Brown et al. | |
| 2021/0191342 A1 | 6/2021 | Lee et al. | |
| 2021/0285671 A1* | 9/2021 | Du | F24F 11/65 |
| 2021/0342380 A1* | 11/2021 | Luus | G06N 3/042 |
| 2021/0381861 A1 | 12/2021 | Brown et al. | |
| 2022/0011731 A1 | 1/2022 | Risbeck et al. | |
| 2022/0058545 A1 | 2/2022 | Warake et al. | |
| 2022/0065479 A1 | 3/2022 | Douglas et al. | |
| 2022/0067851 A1* | 3/2022 | Sinha | G06Q 50/06 |
| 2022/0082280 A1 | 3/2022 | Douglas et al. | |
| 2022/0113050 A1 | 4/2022 | Douglas et al. | |
| 2022/0300521 A1* | 9/2022 | Nayak | G06F 16/24575 |
| 2023/0139152 A1 | 5/2023 | Smith et al. | |
| 2024/0005690 A1* | 1/2024 | Brodie | G06V 30/10 |
| 2024/0095427 A1* | 3/2024 | Kim | G06F 30/27 |

OTHER PUBLICATIONS

Yenduri, Gokul, et al. "Generative Pre-trained Transformer: A Comprehensive Review on Enabling Technologies, Potential Applications, Emerging Challenges, and Future Directions." arXiv preprint arXiv:2305.10435 (2023). (Year: 2023).*

Extended European Search Report of EP Appl. No. 24199683.4 dated Feb. 7, 2025 (9 pages).

* cited by examiner

BUILDING SYSTEM WITH SYNTHETIC DATA COMPLIANCE CONTROL

BACKGROUND

The present disclosure relates generally to control systems for building equipment. The present disclosure relates more particularly to control systems that use predictive modeling to determine an optimal operating strategy and/or maintenance strategy for building equipment.

SUMMARY

One implementation of the present disclosure is a method for controlling building equipment, according to some embodiments. In some embodiments, the method includes generating building data relating to conditions in a building space using a generative artificial intelligence model. In some embodiments, the method includes determining whether the building data correspond to conditions in the building space that comply with one or more regulations or certification standards. In some embodiments, the method includes, in response to determining that the building data correspond to conditions in the building space that comply with the one or more regulations or certification standards, using the building data to operate building equipment that serve the building space.

In some embodiments, using the building data to operate the building equipment includes using the building data to train a predictive model or reinforcement policy, and using the predictive model to generate operating parameters for the building equipment. In some embodiments, the method includes, in response to determining that the building data correspond to conditions in the building space that do not comply with the one or more regulations or certification standards, filtering the building data to remove one or more portions of the building data that correspond to conditions in the building space that do not comply with the one or more regulations or certification standards. In some embodiments, the method includes initiating a fine-tuning process of the generative artificial intelligence model based on the filtered building data.

In some embodiments, the method includes generating a compliance report that indicates one or more of multiple regulations or certification standards with which the building data comply. In some embodiments, the building data includes design parameters for a new building. In some embodiments, the method includes operating a display screen to present the compliance report to a user.

In some embodiments, the one or more regulations or certifications standards include one or more comfort standards, one or more emissions standards, one or more American Society of Heating, Refrigerating, and Air-Conditioning Engineers ("ASHRAE") standards, and an International WELL Building Institute standard. In some embodiments, the building data includes time-series data of operating conditions of the building equipment over a time period. In some embodiments, the generative artificial intelligence model is trained based on a database of real-world building data of multiple different buildings.

Another implementation of the present disclosure is a control system for building equipment, according to some embodiments. In some embodiments, the control system includes building equipment that serve a building space. In some embodiments, the control system includes processing circuitry configured to generate building data relating to conditions in the building space using a generative artificial intelligence model. In some embodiments, the processing circuitry is configured to determine whether the building data correspond to conditions in the building space that comply with one or more regulations or certification standards. In some embodiments, the processing circuitry is configured to, in response to determining that the building data correspond to conditions in the building space that comply with the one or more regulations or certification standards, using the building data to generate a control strategy for the building equipment that serve the building space.

In some embodiments, the processing circuitry is configured to use the building data to operate the building equipment by using the building data to train a predictive model or reinforcement policy and using the predictive model to generate operating parameters for the building equipment. In some embodiments, the processing circuitry is further configured to, in response to determining that the building data correspond to conditions in the building space that do not comply with the one or more regulations or certification standards, filter the building data to remove one or more portions of the building data that correspond to conditions in the building space that do not comply with the one or more regulations or certification standards. In some embodiments, the processing circuitry is configured to initiate a fine-tuning process of the generative artificial intelligence model based on the filtered building data.

In some embodiments, the processing circuitry is further configured to generate a compliance report that indicates one or more of multiple regulations or certification standards with which the building data comply. In some embodiments, the building data includes design parameters for a new building. In some embodiments, the processing circuitry is configured to operate a display screen to present the compliance report to a user.

In some embodiments, the one or more regulations or certifications standards include one or more comfort standards, one or more emissions standards, one or more American Society of Heating, Refrigerating, and Air-Conditioning Engineers ("ASHRAE") standards, and an International WELL Building Institute standard. In some embodiments, the building data include time-series data of operating conditions of the building equipment over a time period. In some embodiments, the generative artificial intelligence model is trained based on a database of real-world building data of multiple different buildings.

Another implementation of the present disclosure is a method for controlling building equipment, according to some embodiments. In some embodiments, the method includes generating building data including operating parameters for building equipment using a generative artificial intelligence model. In some embodiments, the method includes predicting whether the operating parameters will result in conditions in a building space that comply with one or more regulations or certification standards if the operating parameters are used to operate building equipment that serve the building space. In some embodiments, the method includes, in response to predicting that the operating parameters will result in conditions in the building space that comply with the one or more regulations or certification standards, using the building data to operate the building equipment.

In some embodiments, the building data to operate the building equipment includes using the building data to train a predictive model or reinforcement policy, and using the predictive model to generate operating parameters for the building equipment. In some embodiments, the method further includes, in response to determining that the building data correspond to conditions in the building space that do not comply with the one or more regulations or certification standards, filtering the building data to remove one or more portions of the building data that correspond to conditions in the building space that do not comply with the one or more regulations or certification standards. In some embodiments, the method includes initiating a fine-tuning process of the generative artificial intelligence model based on the filtered building data.

In some embodiments, the method includes generating a compliance report that indicates one or more of multiple regulations or certification standards with which the building data comply. In some embodiments, the building data includes design parameters for a new building. In some embodiments, the method includes operating a display screen to present the compliance report to a user.

In some embodiments, the one or more regulations or certifications standards include one or more comfort standards, one or more emissions standards, one or more American Society of Heating, Refrigerating, and Air-Conditioning Engineers ("ASHRAE") standards, and an International WELL Building Institute standard.

In some embodiments, the generative artificial intelligence model is trained based on a database of real-world building data of multiple different buildings. In some embodiments, the generative artificial intelligence model is a large language model.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Referring generally to the FIGURES, systems and methods for using building data provided by a generative artificial intelligence model may mitigate the likelihood that unrealistic data is used to train or inform various building control programs. For example, generative artificial intelligence (GAI) such as large language models may occasionally output inaccurate data which, in the case of building control systems, may result in the building being operated in violation of one or more guidelines (e.g., in an uncomfortable manner). Accordingly, the systems and methods described herein predict conditions that will result from using the building data output by the generative artificial intelligence mode, and filter portions of the building data that would result in uncomfortable conditions in the building. The filtered building data may then be used to fine-tune the generative artificial intelligence such that the generative artificial intelligence does not output building data that would result in uncomfortable conditions.

Building HVAC Systems and Building Management Systems

Figure 1:
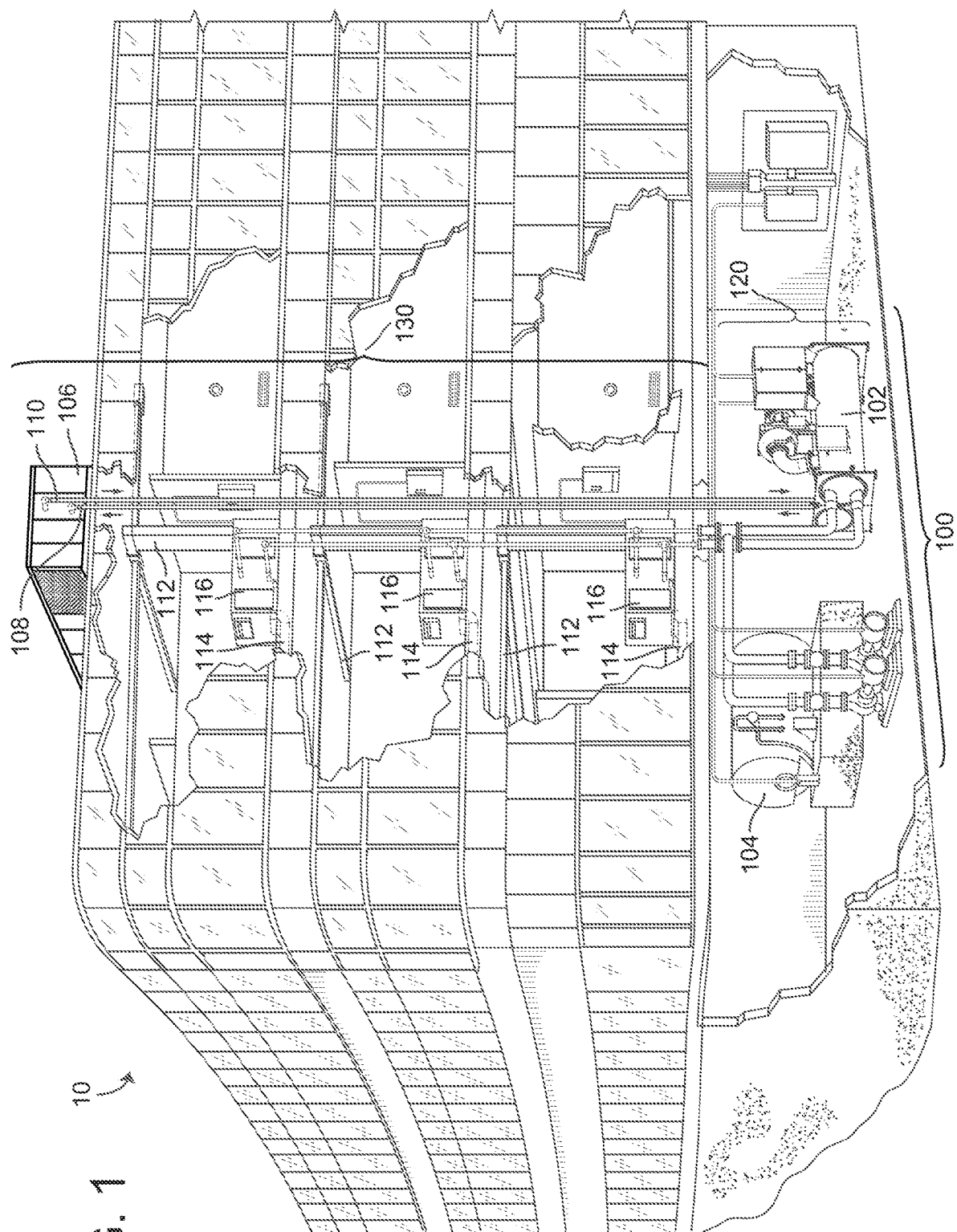
FIG. 1 is an illustration of a building equipped with a HVAC system, according to some embodiments.
Figure 2:
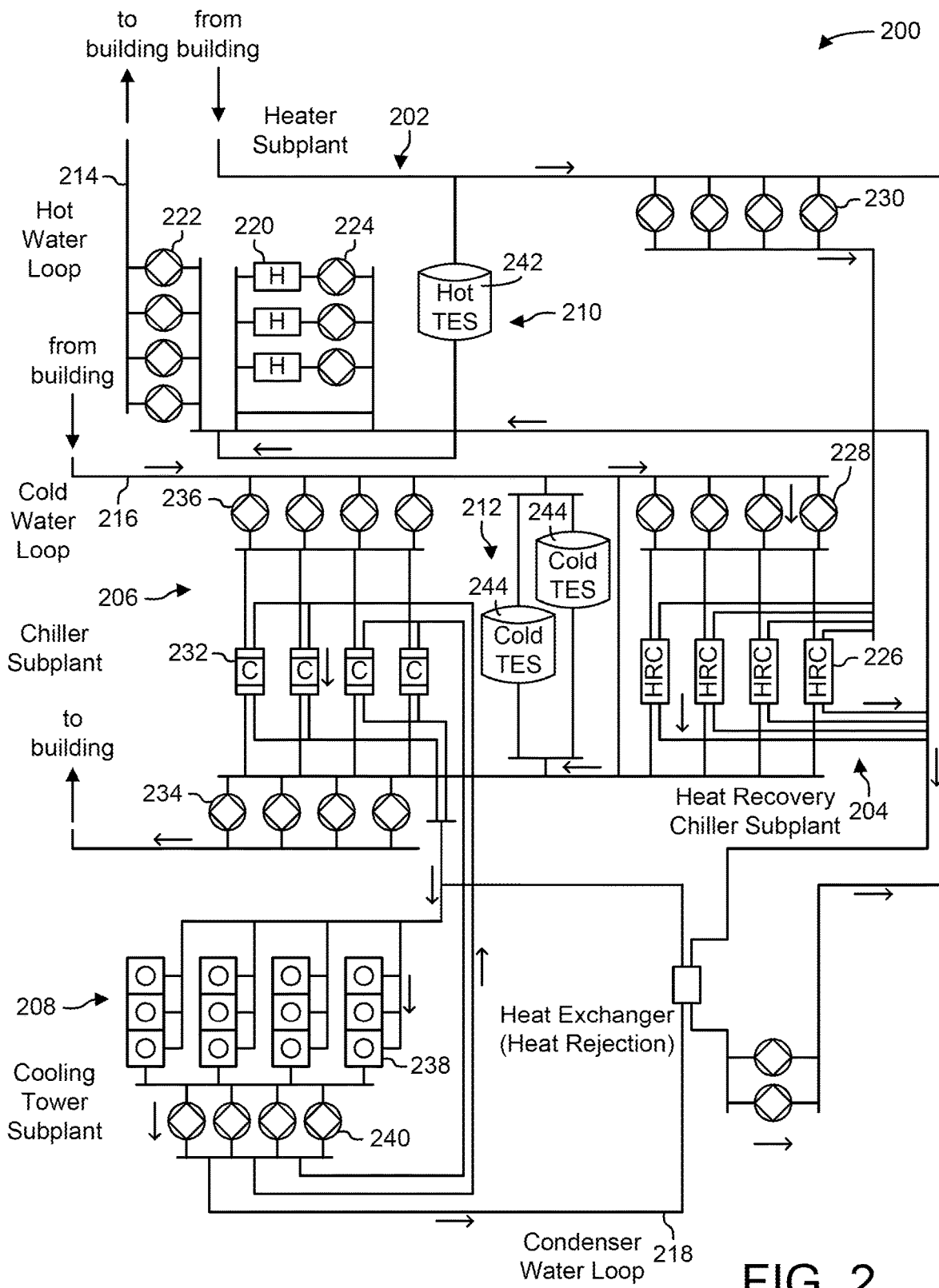
FIG. 2 is a block diagram of a waterside system that may be used in conjunction with the building of FIG. 1, according to some embodiments.
Figure 3:
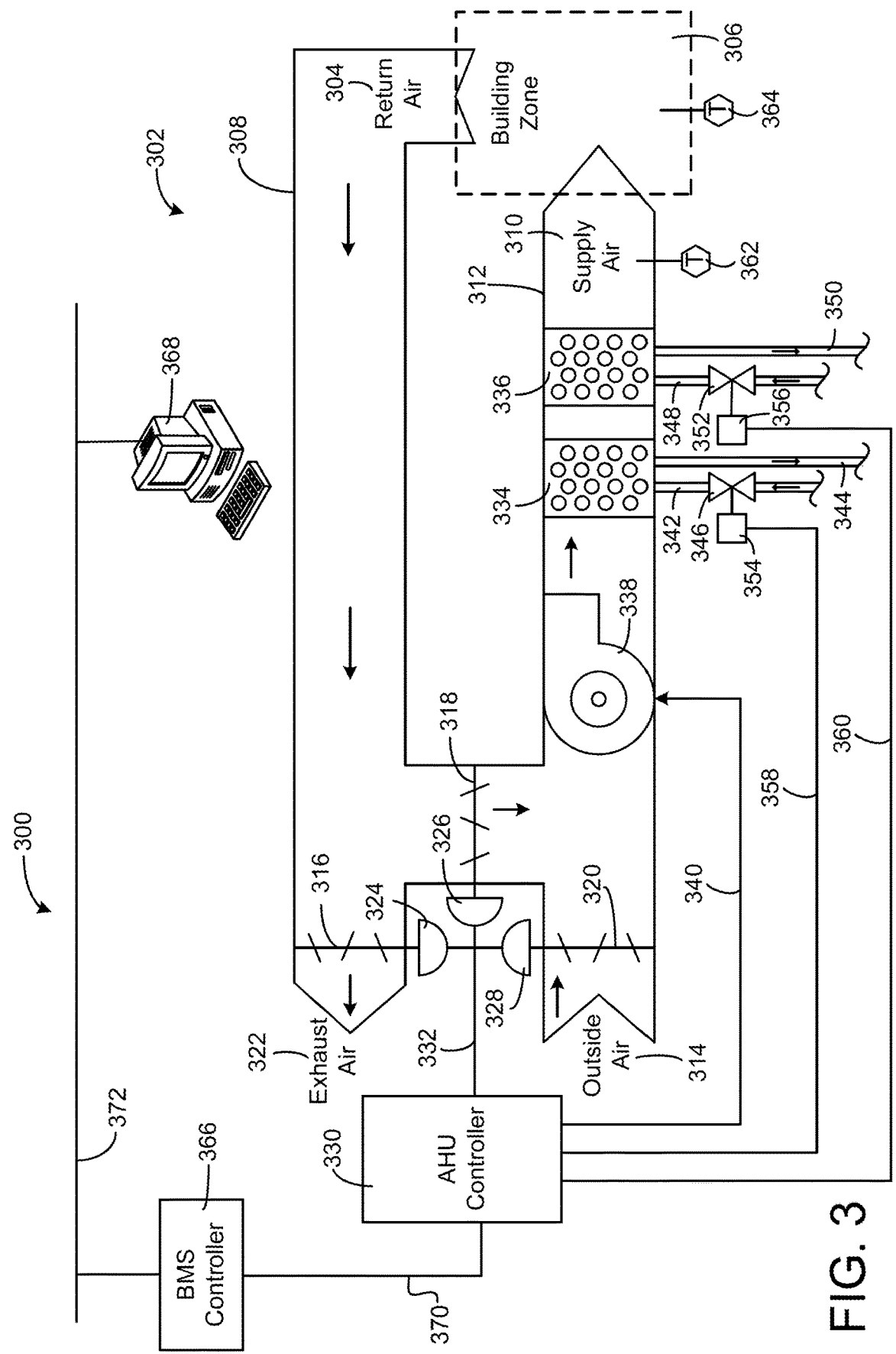
FIG. 3 is a block diagram of an airside system that may be used in conjunction with the building of FIG. 1, according to some embodiments.
Figure 4:
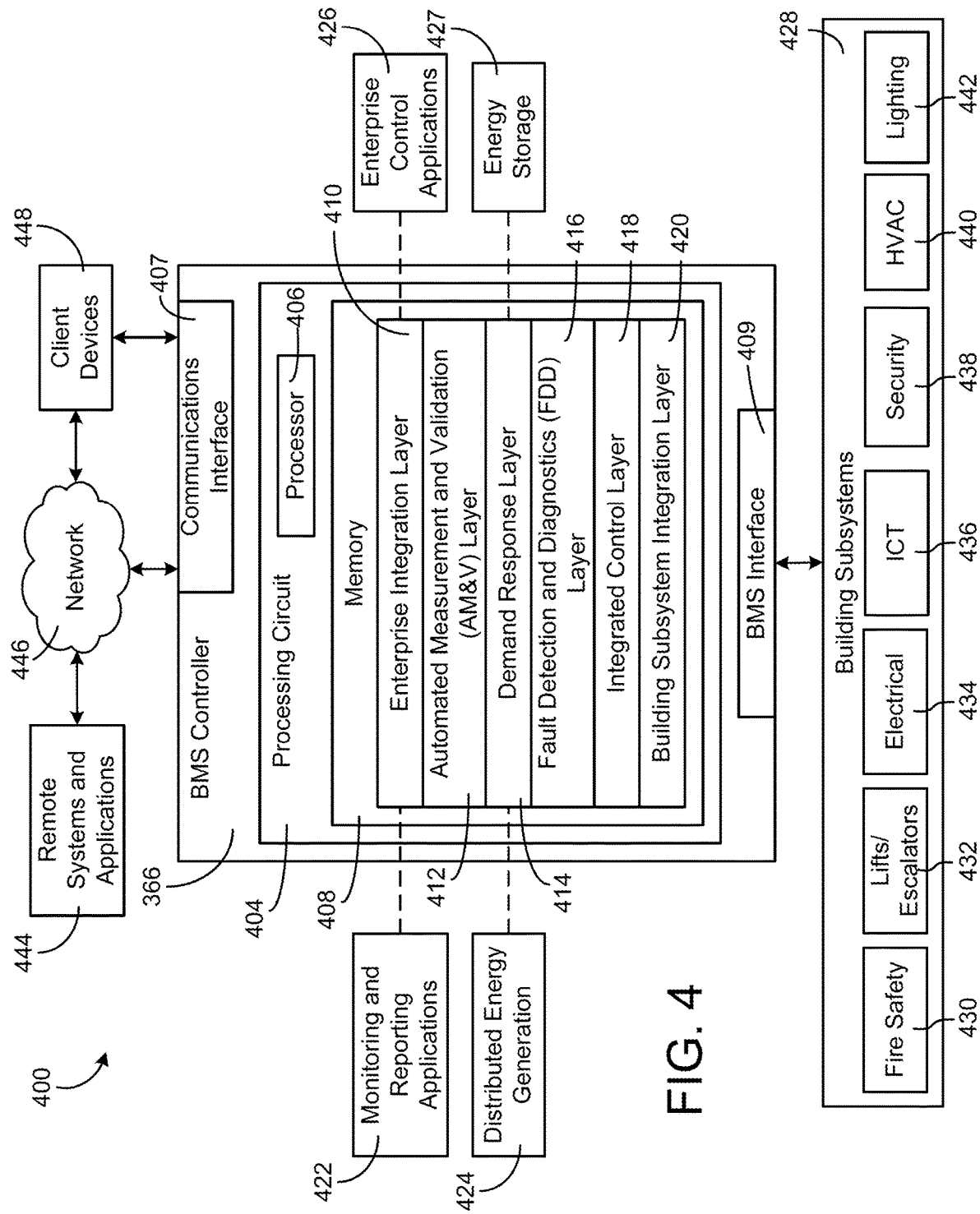
FIG. 4 is a block diagram of a building management system (BMS) which can be used to monitor and control the building of FIG. 1, according to some embodiments.
Figure 5:
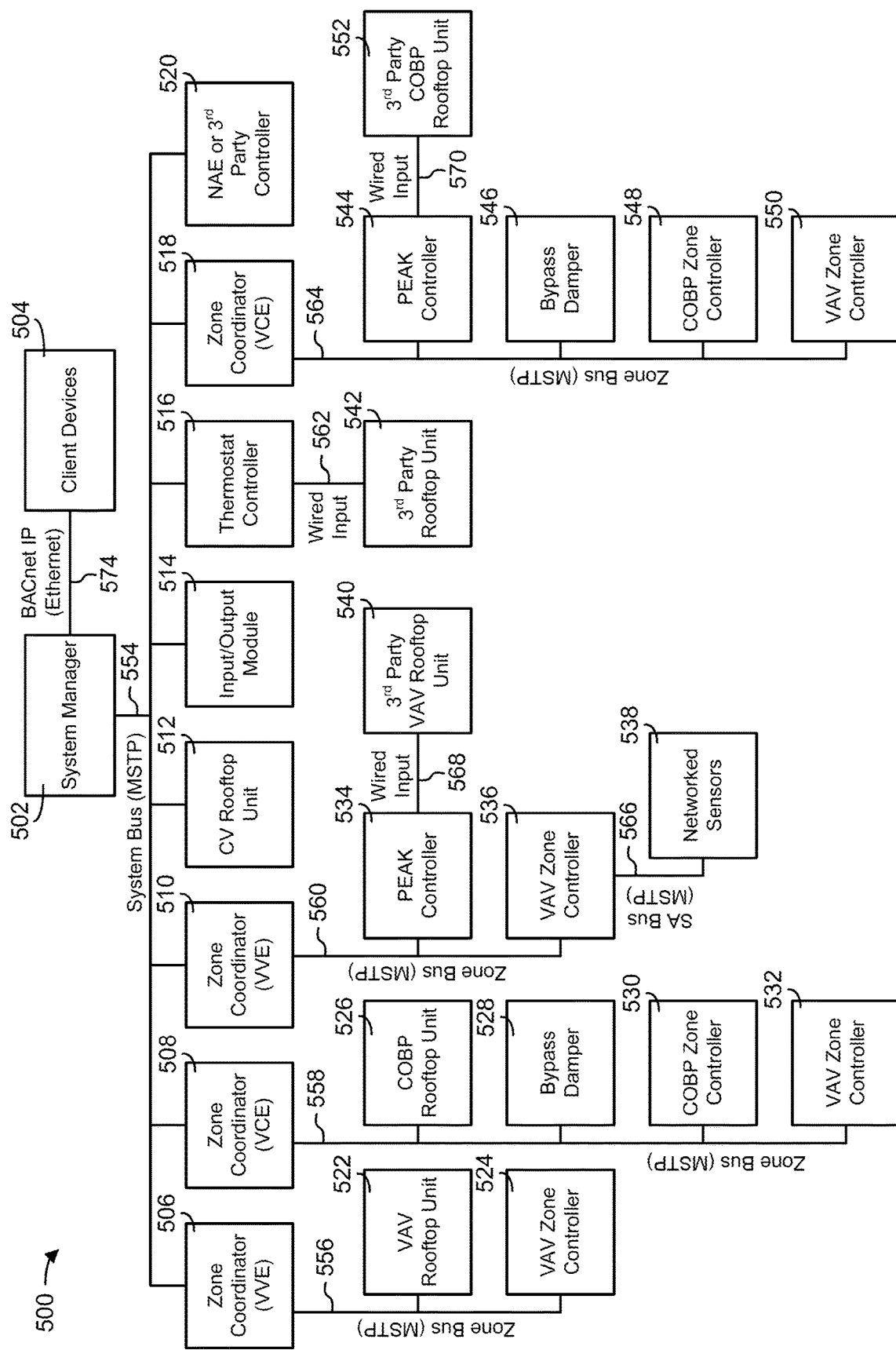
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532,

536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Building Data Compliance

Data Compliance System

Figure 6:
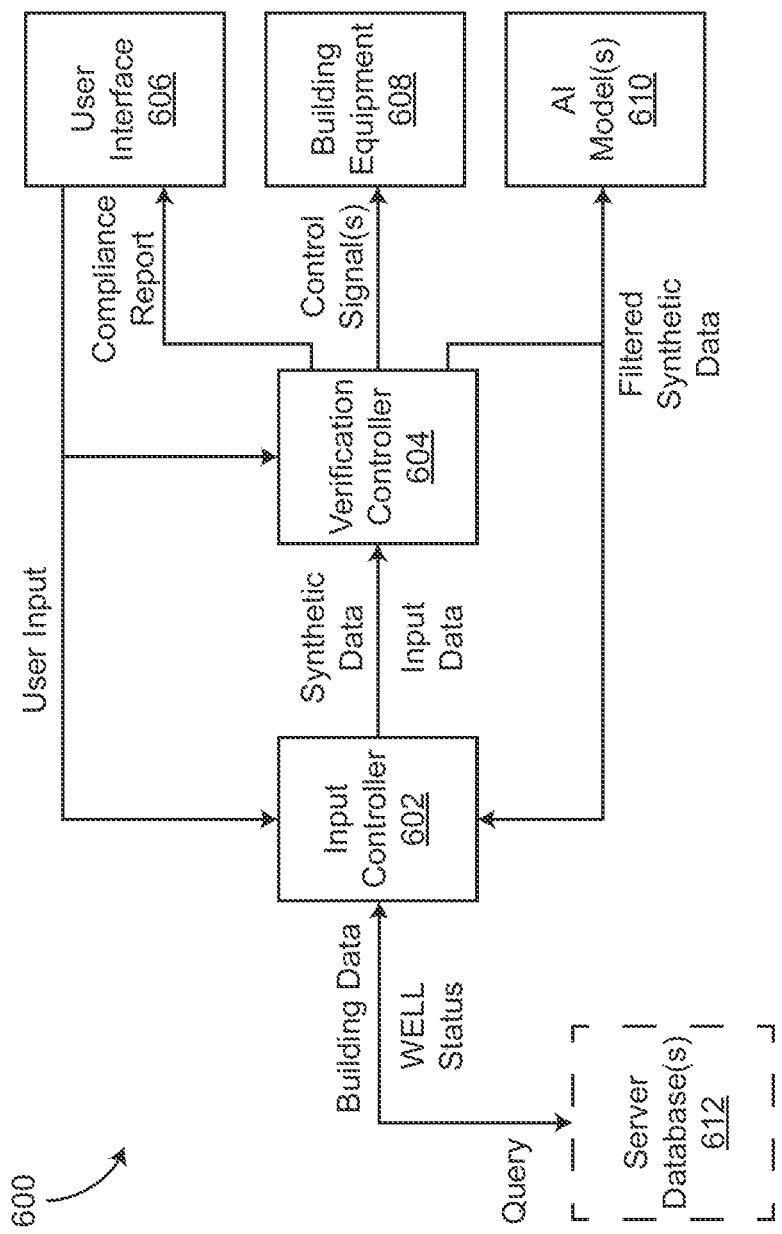
FIG. 6 is a block diagram of a compliance determination system, according to some embodiments.

Referring now to FIG. 6, a compliance determination system 600 is shown, according to an exemplary embodiment. The compliance determination system 600 can be configured to evaluate synthetic data generated by generative artificial intelligence (GAI) for compliance with various standards, regulations, thresholds, or other benchmarks. As used herein, the terms "synthetic," "generated," "simulated," "artificial," and like terms are synonymous and refer to the data generated by one or more GAI models. As shown in FIG. 6, the compliance determination system 600 includes an input controller 602, a verification controller 604, a user interface 606, building equipment 608, and one or more artificial intelligence ("AI") models 610, according to some embodiments. In some embodiments, the input controller 602 is configured to generate synthetic data of the building 10 (e.g., simulated data, artificial data, time-series data, etc.) and provide the synthetic data to the verification controller 604. The synthetic data may include a variety of different types of data which can be generated by the AI models 610 including, for example, synthetic building data relating to environmental conditions in a building space (e.g., synthetic measurements of environmental conditions in the building space, synthetic sensor data from various sensors of the building 10, etc.), synthetic operating parameters for building equipment that serve the building space (e.g., synthetic control signals, synthetic setpoints, etc.), synthetic operating conditions for one or more pieces of equipment of the building 10 (e.g., equipment of the building subsystems 428). In some embodiments, the synthetic data includes operating conditions for the chiller 102, thermal comfort data of one or more spaces of the building 10, temperature, humidity, and/or air quality of one or more spaces of the building 10.

In some embodiments, the synthetic data includes operating conditions (e.g., time series data) of equipment of the building subsystems 428 such as temperature, pressure, flow rate of chiller water, refrigerant flow rate, etc. In some embodiments, the synthetic data includes time-series data of any conditions or control parameters of a chiller, a boiler, any number of air handling units, economizers, field controllers, supervisory controllers, actuators, temperature sensors, and other devices for controlling the temperature, humidity, airflow, or other variable conditions within building 10 of the HVAC subsystem 440. The synthetic data may be generated by a generative AI model of the input controller 602.

In some embodiments, the input controller 602 can provide input data to the verification controller 604. In some embodiments, the input data may be similar to the synthetic data that is generated by the generative AI model of the input controller 602, but may be real-world or simulated time-series data of a building (e.g., the building 10). In some embodiments, the input data is provided by a customer or building administrator to determine if a building (e.g., a simulated building, a target building, a building to be purchased, a building to be certified, a newly constructed building, etc.) meets one or more certification criteria (e.g., to generate a compliance report).

In some embodiments, the synthetic data (e.g., synthetic building data) or input data (e.g., simulated building data, real-world building data, etc.) may include time-series data of space conditions (e.g., temperature, humidity, environmental conditions in the space, etc.). In some embodiments, the synthetic data or input data include operating parameters such as control signals, setpoints (e.g., building equipment setpoints, operating points, settings, etc.), or operating commands for the building equipment 608. The operating parameters may be provided as a time-series of values for various operating parameters of the building equipment 608. If the synthetic data or the input data includes the operating parameters, then the verification controller 604 may be configured to predict environmental or space conditions (e.g., temperature, humidity, risk of infection, carbon dioxide, etc.) resulting from operating the building equipment 608 according to the operating parameters. Similarly, if the synthetic data or input data includes the time-series data of space conditions, then the verification controller 608 may be configured to generate time-series values of corresponding operating parameters for the building equipment 608 in order to achieve the time-series data of the space conditions.

Referring still to FIG. 6, the verification controller 604 may be configured to evaluate the synthetic data for compliance with various regulations, standards, thresholds, or other benchmarks (e.g., ASHRAE standards, comfort standards, certification standards, emissions standards, etc.). In some embodiments, the verification controller 604 directly compares the synthetic data against one or more thresholds specified in the standards, which may be possible if the synthetic data are for the same variable or condition to which the standards apply. For example, if a given standard relates to the minimum acceptable ventilation rate and the synthetic data includes synthetic values of ventilation rate, the verification controller 604 may directly compare the synthetic values of the ventilation rate against the minimum ventilation thresholds specified by the standard. As another example, if a given standard relates to occupant comfort within a building space (e.g., comfortable temperature values or ranges, comfortable humidity values or ranges, etc.) and the synthetic data includes synthetic values of temperature or humidity, the verification controller 604 may directly compare the synthetic temperature or humidity values against the thresholds or ranges specified by the standard.

In some embodiments, the verification controller 604 is configured to translate or transform the synthetic data into the appropriate variables, units, or other values specified by the standard to allow for direct comparison. For example, if a given standard relates to the minimum acceptable ventilation rate but the synthetic data includes synthetic values of a control signal for an air handling unit, the verification controller 604 may use a model (e.g., a predictive model, an equipment operating model, etc.) to determine the ventilation rate that would result from the synthetic values of the control signal and then compare the determined ventilation rate against the minimum ventilation thresholds specified by the standard. As another example, if a given standard relates to occupant comfort within a building space (e.g., comfortable temperature values or ranges, comfortable humidity values or ranges, etc.) and the synthetic data includes synthetic values of control signals or operating commands for building equipment that operate to affect temperature or humidity, the verification controller 604 may use predictive temperature or humidity models to predict the values of temperature or humidity in the building space that will result from operating the building equipment using the synthetic data. The verification controller 604 may then compare the predicted temperature or humidity values against the thresholds or ranges specified by the standard. The verification controller 604 may include any number or type of predictive models (e.g., temperature models, humidity models, air quality models, ventilation models, comfort models, etc.) which can be used to predict the values of various environmental conditions of a building space or other variables specified by the standards based on the synthetic data.

In some embodiments, the verification controller 604 may be configured to output control signal(s) to building equipment 608 in order to operate the building equipment 608 to affect an environmental or variable condition of one or more spaces, zones, rooms, etc., of a building (e.g., the building 10). In some embodiments, the verification controller 604 is configured to use the synthetic data or filtered synthetic data in order to control the building equipment 608.

The verification controller 604 may be configured to output filtered synthetic data to the input controller 602 and/or to the AI model(s) 610, according to some embodiments. In some embodiments, the filtered synthetic data is a subset of the synthetic data provided by the input controller 602. For example, the filtered synthetic data may be similar to the synthetic data with one or more portions removed. In some embodiments, the verification controller 604 is configured to provide the filtered synthetic data to the AI models 610 for training the AI models 610 according to the filtered synthetic data with one or more portions of data that do not comply with one or more standards removed. In this way, the AI models 610 can be trained in order to control building equipment in a manner compliant with one or more standards.

Verification Controller

Figure 7:
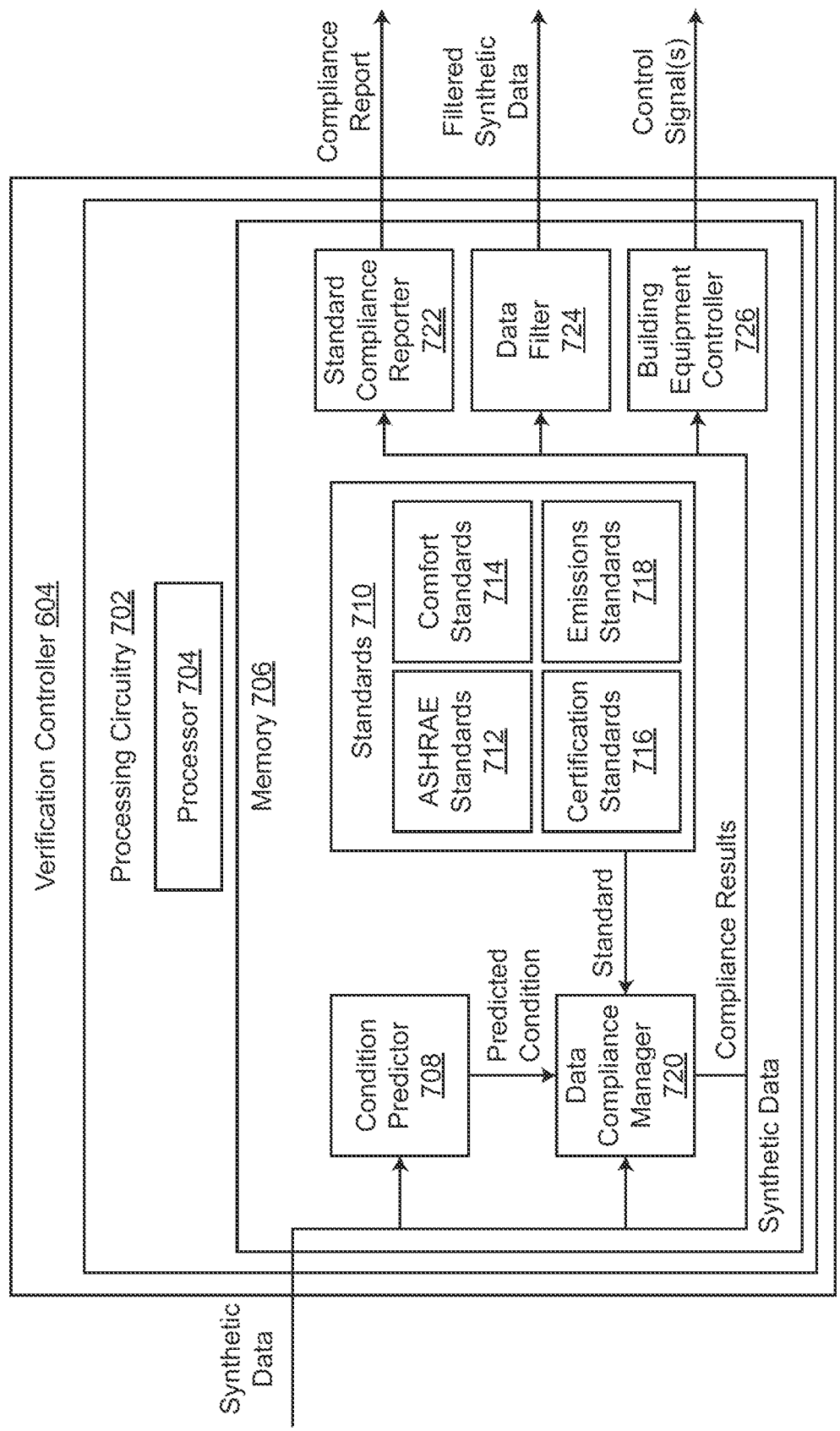
FIG. 7 is a block diagram of a verification controller of the compliance determination system of FIG. 6, according to some embodiments.

Referring particularly to FIG. 7, the verification controller 604 includes processing circuitry 702 including a processor 704 and memory 706. Processing circuitry 702 can be communicably connected to a communications interface such that processing circuitry 702 and the various components thereof can send and receive data via the communications interface. Processor 704 can be implemented as a general purpose processor, an application specific integrated circuit (ASIC), one or more field programmable gate arrays (FPGAs), a group of processing components, or other suitable electronic processing components.

Memory 706 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 706 can be or include volatile memory or non-volatile memory. Memory 706 can include database components, object code components, script components, or any other type of information structure for supporting the various activities and information structures described in the present application. According to some embodiments, memory 706 is communicably connected to processor 704 via processing circuitry 702 and includes computer code for executing (e.g., by processing circuitry 702 and/or processor 704) one or more processes described herein.

The memory 706 includes a condition predictor 708, a data compliance manager 720, one or more standards 710, a standard compliance reporter 722, a data filter 724, and a building equipment controller 726. The condition predictor 708 is configured to use the synthetic data in order to predict a condition, shown as predicted condition, which is provided to the data compliance manager 720. The data compliance manager 720 may receive the predicted condition and the synthetic data, and provide one or more compliance results to the standard compliance reporter 722, the data filter 724, and the building equipment controller 726 along with an indication of one or more portions of the synthetic data corresponding to the compliance results. The data compliance manager 720 is also configured to receive one or more of the standards 710 and use the standards 710 in order to determine the compliance results. The standard compliance reporter 722 is configured to output a compliance report (e.g., to the user interface 606), according to some embodiments. The data filter 724 is configured to output filtered synthetic data, according to some embodiments. The building equipment controller 726 is configured to output control signals (e.g., to the building equipment 608), according to some embodiments. In some embodiments, the building equipment controller 726 includes a predictive model that is configured to be trained using the synthetic data. In some embodiments, the predictive model of the building equipment controller 726 is configured to generate operating parameters for the building equipment 608. In some embodiments, the building equipment controller 726 is configured to provide control signals to the building equipment 608 to operate the building equipment 608 according to the control signals.

Referring still to FIG. 7, the condition predictor 708 may be configured to implement one or more models (e.g., building models) and predict conditions of one or more spaces by providing the synthetic data as inputs to the one or more models. In some embodiments, the one or more models include building models, thermal models, differential equations, etc., that model or predict temperature, humidity, etc., of one or mores zones, rooms, or spaces of the building 10. In some embodiments, the one or more models include energy consumption models configured to predict electrical energy or resource consumption of the building equipment 608. In some embodiments, the one or more models include resource production models configured to predict clean air delivery, heating loads, cooling loads, etc. In some embodiments, the one or more models include emissions models configured to predict a quantity, amount, or rate of carbon emissions as a result of operating the building equipment 608 according to the synthetic data.

In some embodiments, the condition predictor 708 is optional. For example, the synthetic data may include, not only control decisions for equipment, but also thermal comfort data, environmental conditions, etc. In some embodiments, the synthetic data includes one or more operating conditions or HVAC chiller operating conditions indicative of quality or condition of the equipment. In some embodiments, the synthetic data may include temperature, humidity, and air quality of different spaces. In some embodiments, the synthetic data includes environmental conditions in various spaces. In some embodiments, the synthetic data includes temperature setpoints of various zones, spaces, or rooms of the building 10.

Referring still to FIG. 7, the data compliance manager 720 is configured to receive one or more predicted conditions from the condition predictor 708 (e.g., model outputs), the synthetic data, and one or more of the standards 710, according to some embodiments. In some embodiments, the one or more standards 710 include an American Society of Heating, Refrigerating, and Air-Conditioning Engineers ("ASHRAE") standards 712, one or more comfort standards 714, one or more certification standards 716, and one or more emissions standards 718. In some embodiments, the ASHRAE standards 712 include ASHRAE standard 55 for comfort, an ASHRAE standard for ventilation, a standard for managing infection risks in buildings, etc. In some embodiments, the standards 710 include one or more design guidelines that indicate a building must be capable of performing one or more actions (e.g., a sufficient level of air conditioning, a sufficient level of infection risk reduction, etc.). In some embodiments, the standards 710 may be thresholds or ranges. For example, the comfort standards 714 may include an acceptable range of indoor temperature, humidity, and air quality. The certification standards 716 may include an International WELL Building Institute standard.

The data compliance manager 720 is configured to use the standards in order to provide compliance results of the synthetic data (and optionally, the predicted conditions output by the condition predictor 708 based on the synthetic data) to the standard compliance reporter 722, the data filter 724, and the building equipment controller 726, according to some embodiments. In some embodiments, the compliance results indicate which of the standards 710 the synthetic data complies with or which standards 710 the synthetic data does not comply with. In some embodiments, the data compliance manager 720 is configured to output an indication of which portions or sections of the synthetic data that result in the non-compliance of the synthetic data with the one or more standards 710. For example, if the synthetic data includes or results in a portion which exceeds or deviates from one or more comfort standards 714, the data compliance manager 720 may provide an indication of which portions of the synthetic data result in the non-compliance of the standards 710. In some embodiments, the compliance results are provided to the standard compliance reporter 722, as well as the data filter 724.

Referring still to FIG. 7, the standard compliance reporter 722 is configured to generate and output a compliance report indicating which of the standards 710 the synthetic data complies with, according to some embodiments. For example, the compliance report may include a listing of all the standards 710 that the synthetic data has been tested to determine compliance or non-compliance with, according to some embodiments. The compliance report may be provided as a GUI or UI that is displayed to a user via the user interface 606, or may be provided as a report file including indications of which of the standards 710 the synthetic data complies with.

Referring still to FIG. 7, the data filter 724 is configured to receive the synthetic data as well as the compliance results, and the indication of which portions of the synthetic data result in non-compliance of the synthetic data with one or more of the standards 710, according to some embodiments. In some embodiments, the data filter 724 is configured to filter the synthetic data by removing one or more portions of the synthetic data that result in non-compliance of the synthetic data with the one or more standards 710. For example, the data filter 724 may remove portions or time-series portions of the synthetic data that result in the non-compliance with the one or more standards 710 and provide the filtered synthetic data to the AI models 610 and/or the input controller 602. In some embodiments, the filtered synthetic data is a subset of the synthetic data, excluding one or more sections of the synthetic data that result in non-compliance of the synthetic data with the standards 710. In some embodiments, the filtered synthetic data is used in order to fine-tune or adjust artificial intelligence or neural network models used to generate the synthetic data in order to train or adjust the artificial intelligence or neural network models to produce synthetic data that complies with one or more of the standards 710.

Input Controller

Figure 8:
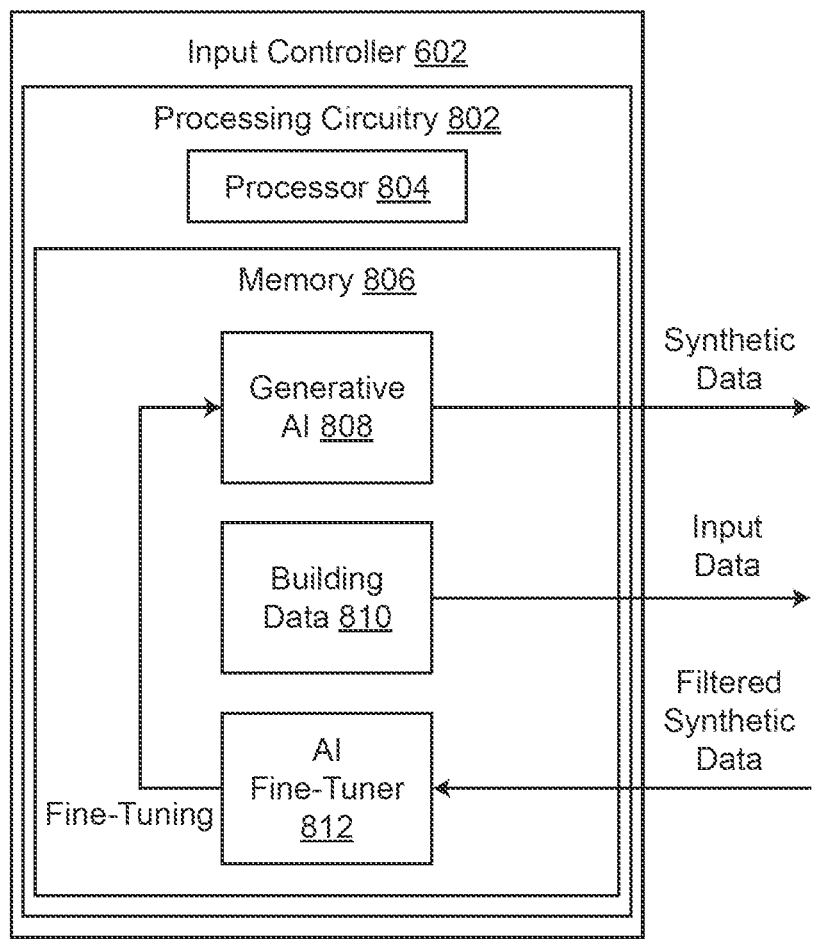
FIG. 8 is a block diagram of an input controller of the compliance determination system of FIG. 6, according to some embodiments.

Referring to FIG. 8, the input controller 602 is shown in greater detail, according to some embodiments. In some embodiments, the input controller 602 includes includes processing circuitry 802 including a processor 804 and memory 806. Processing circuitry 802 can be communicably connected to a communications interface such that processing circuitry 802 and the various components thereof can send and receive data via the communications interface. Processor 804 can be implemented as a general purpose processor, an application specific integrated circuit (ASIC), one or more field programmable gate arrays (FPGAs), a group of processing components, or other suitable electronic processing components.

Memory 806 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 806 can be or include volatile memory or non-volatile memory. Memory 806 can include database components, object code components, script components, or any other type of information structure for supporting the various activities and information structures described in the present application. According to some embodiments, memory 806 is communicably connected to processor 804 via processing circuitry 802 and includes computer code for executing (e.g., by processing circuitry 802 and/or processor 804) one or more processes described herein.

As shown in FIG. 8, the memory 806 includes a generative artificial intelligence ("generative AI") 808, building data 810, and an AI-fine tuner 812, according to some embodiments. In some embodiments, the generative AI 808 is configured to produce the synthetic data and provide the synthetic data to the verification controller 604. The generative AI 808 may be a large language model network such as a generative pre-trained transformer ("GPT") network. In some embodiments, the generative AI 808 is a unimodal or multimodal network. In some embodiments, the generative AI 808 may include one or more of the generative AI models or any other features or functionality described in U.S. Provisional Patent Application No. 63/470,074 filed May 31, 2023, U.S. Provisional Patent Application No. 63/470,078 filed May 31, 2023, U.S. Provisional Patent Application No. 63/470,119 filed May 31, 2023, U.S. Provisional Patent Application No. 63/470,122 filed May 31, 2023, U.S. Provisional Patent Application No. 63/470,118 filed May 31, 2023, U.S. Provisional Patent Application No. 63/470,120 filed May 31, 2023, U.S. Provisional Patent Application No. 63/470,121 filed May 31, 2023, and/or U.S. Provisional Patent Application No. 63/470,123 filed May 31, 2023, the entire disclosures of which are incorporated by reference herein.

The AI fine-tuner 812 may initiate a fine-tuning process of the generative AI 808 based on the filtered synthetic data provided by the data filter 724, according to some embodiments. In some embodiments, the fine-tuning process initiated by the AI fine-tuner 812 may be initiated in order to adjust parameters of the generative AI 808 (e.g., training or tuning the generative AI 808 based on the filtered synthetic data). The fine-tuning process may include adapting or adjusting a structure of the generative AI 808 based on the filtered synthetic data by adding or removing layers to the existing generative AI 808 such that the generative AI 808 produces synthetic data that is compliant with the one or more standards 710 or with selected one or more standards 710.

The input controller 602 may include building data 810 and provide the building data 810 as input data to the verification controller 604, according to some embodiments. In some embodiments, the input data is used similarly to the synthetic data by the verification controller 604 but is not provided to the data filter 724. For example, the building data 810 may be a request from a user to initiate the functionality of the verification controller 604 to determine if the building data 810 of a particular building meets one or more standards or certifications. For example, the functionality of the verification controller 604 may be used in order to determine if the particular building has a high likelihood of meeting the International WELL Building Institute standard. In some embodiments, the building data 810 is obtained from a database of multiple buildings throughout a geographical area.

In some embodiments, the building data 810 includes data provided by a user that desires to know if the building corresponding to the building data 810 has a high likelihood of meeting the International WELL Building Institute Standard. In some embodiments, the input controller 602 is configured to obtain multiple datasets of the building data 810 as well as indications of whether or not the buildings correspond to the building data 810 meet the International WELL Building Institute Standard. The input controller 602 may provide the building data 810 as well as the indication of whether or not the buildings that corresponding to the building data 810 meet the International WELL Building Institute Standard to the AI fine-tuner 812 for use in initiating fine-tuning of the generative AI 808 to predict if a set of building data will meet the International WELL Building Institute Standard. In this way, the generative AI 808, or a similar AI (e.g., a separate AI implemented on the verification controller 604) can be trained or tuned in order to predict if a specific building will have a high likelihood of meeting the International WELL Building Institute Standard. In some embodiments, the input controller 602 and the verification controller 604 are configured to train or fine tune a different type of neural network, AI, or machine learning in order to determine or predict if a specific building has a high likelihood of meeting the International WELL Building Institute Standard.

Referring now to FIGS. 6 and 8, the input controller 602 may obtain the building data (e.g., multiple sets of building data 810) from one or more server databases 612 (e.g., Internet databases) as well as the International WELL Building Institute Standard indications (e.g., whether or not the buildings comply with the International WELL Building Institute Standard). The input controller 602 may provide the query to various publicly accessible databases on the Internet and use the returned data in order to fine tune, train, or update a neural network or AI to predict if a building corresponding to a new set of building data will likely achieve an International WELL Building Institute Standard. In some embodiments, the verification controller 604 is also configured to communicate with the server database(s) 612 or with another Internet server in order to identify when new standards, certifications, etc., are released (e.g., new ASHRAE standards, emissions standards, etc.) in order to determine if real-world buildings or the synthetic data complies with the new standards, certifications, etc. In this way, the functionality of the compliance determination system 600 may be prompted in response to updated standards, certifications, etc., in order to determine if changes to a building (e.g., either an existing and built building, or a building in a design phase) should be made in order to comply with the updated standards, certifications, etc.

Processes

Figure 9:
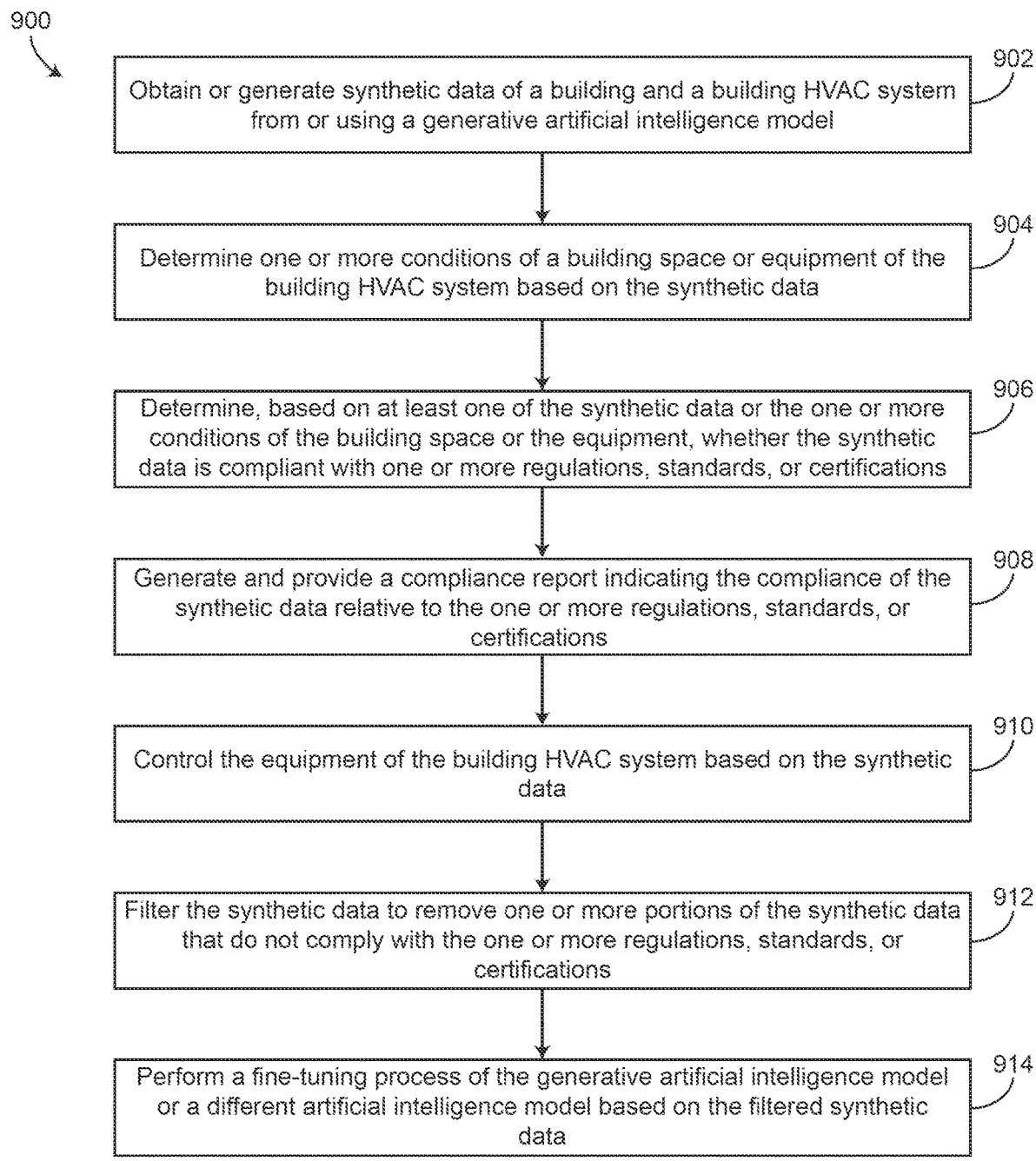
FIG. 9 is a flow diagram of a process for controlling building equipment and initiating fine-tuning of a generative artificial intelligence model based on synthetic building data, according to some embodiments.

Referring to FIG. 9, a flow diagram of a process 900 for tuning a generative AI includes steps 902-914, according to some embodiments. In some embodiments, the process 900 is performed in order to fine tune a generative AI such that the generative AI does not generate synthetic data which would result in non-compliant building performance (e.g., excessively high or low temperature setpoints, failing to meet one or more emissions standards, etc.). The process 900 may be implemented or performed by the compliance determinations system 600, according to some embodiments.

The process 900 includes obtaining or generating synthetic data of a building and a building HVAC system from or using a generative AI model (step 902), according to some embodiments. In some embodiments, the synthetic data is building data resulting from a simulation, a neural network, an AI, machine learning, etc., or data other than collected from sensor of a real-world building over a time period. The synthetic data may include time-series data of any operating conditions, HVAC equipment (e.g., chiller) operating conditions, data indicative of equipment quality or condition, temperature, humidity, or air quality of different spaces, environmental conditions, thermal comfort ranges, temperature setpoints, humidity setpoints, air quality setpoints, service recommendations, control decisions, energy or electricity consumption, resource consumption, resource cost, etc. In some embodiments, step 902 is performed by the input controller 602 and/or the verification controller 604 of the compliance determination system 600. The synthetic data may, alternatively, be historical data or collected data of a real-world building in order to identify if the real-world building has a high likelihood of meeting different standards or achieving one or more certifications.

The process 900 includes determining one or more conditions of a building space or equipment of the building HVAC system based on the synthetic data (step 904), according to some embodiments. In some embodiments, step 904 includes using a model (e.g., a thermal model of a building representing various thermal or heat transfer characteristics of the building or spaces of the building) to predict conditions of the building space or equipment of the building HVAC system. In some embodiments, step 904 is performed by the condition predictor 708.

The process 900 includes determining, based on at least the synthetic data or the one or more conditions of the building space or the equipment, whether the synthetic data is compliant with one or more regulations, standards or certifications (step 906), according to some embodiments. In some embodiments, step 906 is performed by the data compliance manager 720 using the standards 710. The standards, regulations, certifications, or codes may include various ASHRAE standards, comfort standards, certification standards, emissions standards, etc. In some embodiments, the standards, regulations, certifications or codes include thresholds or ranges for various parameters. In some embodiments, the standards, regulations, certifications, or codes include the International WELL Building Institute standard.

The process 900 includes generating and providing a compliance report indicating the compliance of the synthetic data relative to the one or more regulations, standards, or certifications (step 908), according to some embodiments. In some embodiments, step 908 includes generating a list of the one or more regulations, standards, or certifications, as well as indications of which of the regulations, standards, or certifications that the synthetic data meets or fails to meet. In some embodiments, the compliance report is generated by the standard compliance reporter 722. In some embodiments, the compliance report is provided to a user via the user interface 606.

The process 900 includes controlling the equipment of the building HVAC system based on the synthetic data (step 910), according to some embodiments. In some embodiments, the synthetic data includes control decisions for building equipment of a real-world building HVAC system. The building HVAC system may be operated based on the control decisions in the synthetic data if the synthetic data is determined to satisfactorily meet one or more of the regulations, standards, or certifications, according to some embodiments. In some embodiments, the building HVAC system is controlled according to filtered or updated synthetic data (e.g., as described in greater detail below with reference to steps 912-914).

The process 900 includes filtering the synthetic data to remove one or more portions of the synthetic data that do not comply with the one or more regulations, standards, or certifications (step 912), according to some embodiments. In some embodiments, step 912 includes identifying which portions of the synthetic data result in the synthetic data not complying with one or more of the regulations, standards, or certifications. In some embodiments, step 912 is performed by the data compliance manager 720 and the data filter 724. In some embodiments, step 912 includes removing the portions of the synthetic data that result in non-compliance of the synthetic data with the one or more regulations, standards, or certifications.

The process 900 includes performing a fine-tuning process of the generative artificial intelligence model or a different artificial intelligence model based on the filtered synthetic data (step 914), according to some embodiments. In some embodiments, step 914 is performed by the input controller 602, or more specifically, by the AI fine-tuner 812. For example, the generative artificial intelligence that is used to generate the synthetic data may be fine-tuned based on the filtered synthetic data such that the generative AI generates data that is compliant with the one or more standards, regulations, or certifications. In some embodiments, process 900 returns to step 902 in response to performing step 914 and performs steps 902-906, 912, and 914 iteratively until the generative AI model generates, with a high level of confidence, synthetic building data that meets the one or more regulations, standards, or certifications.

Figure 10:
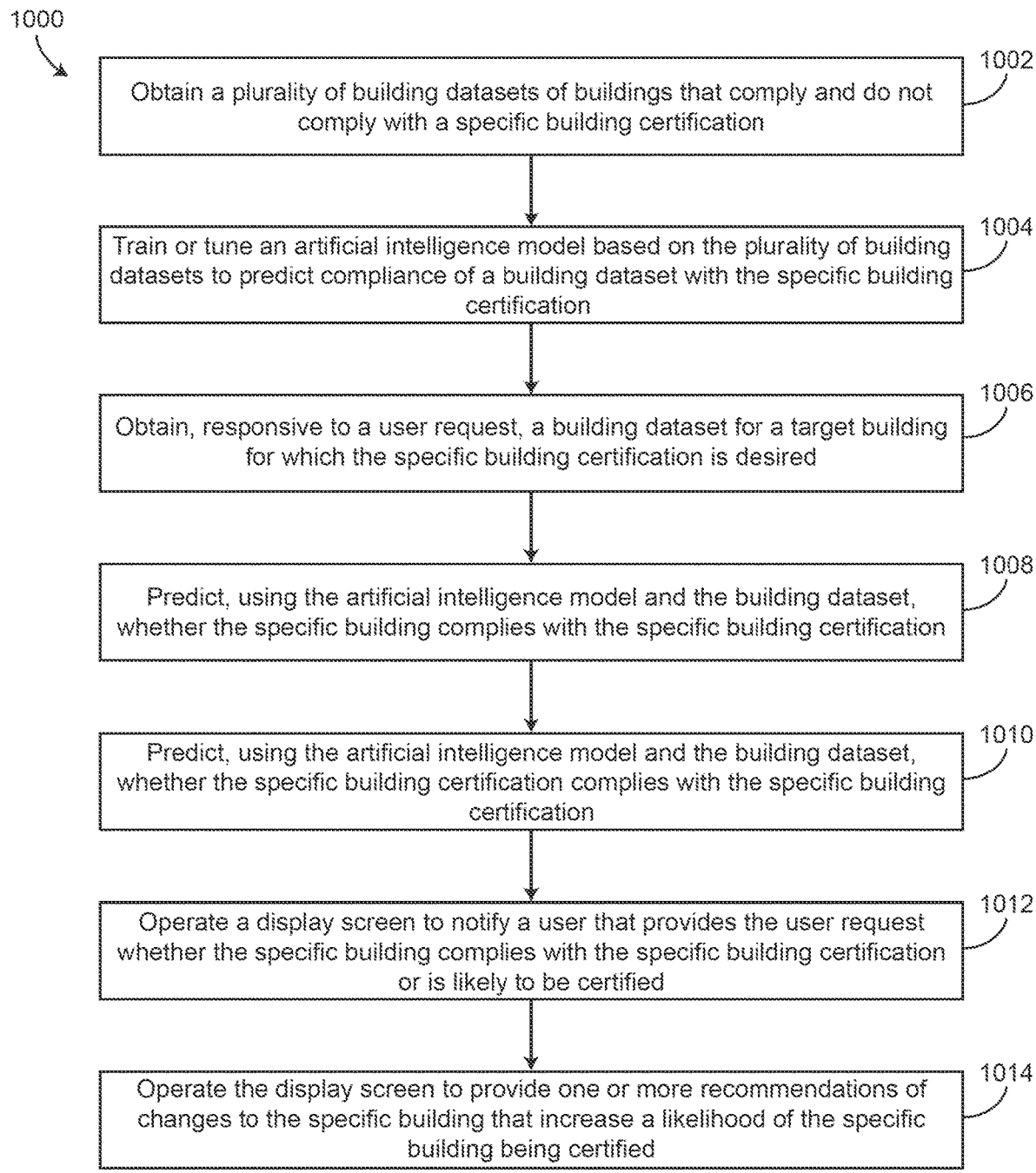
FIG. 10 is a flow diagram of a process for predicting if a building can achieve a specific certification, according to some embodiments.

Referring to FIG. 10, a process 1000 for predicting a likelihood of a building achieving a specific certification includes steps 1002-1012, according to some embodiments. In some embodiments, the process 1000 is performed by the compliance determination system 600 in order to identify if a building has a high likelihood of being certified and, if the building does not have a high likelihood of being certified, which changes may be made to the building to increase a likelihood of the building being certified.

The process 1000 includes obtaining a plurality of datasets of buildings that comply and do not comply with a specific building certification (step 1002), according to some embodiments. In some embodiments, step 1002 includes querying multiple online databases of building that are publicly accessible (e.g., building data of buildings with known certification or absent certification). In some embodiments, the building data includes time-series data of any operating conditions, HVAC equipment (e.g., chiller) operating conditions, data indicative of equipment quality or condition, temperature, humidity, or air quality of different spaces, environmental conditions, thermal comfort ranges, temperature setpoints, humidity setpoints, air quality setpoints, service recommendations, control decisions, energy or electricity consumption, resource consumption, resource cost, etc. In some embodiments, step 1002 is performed by the input controller 602 by querying the server databases 612. The specific building certification may be the International WELL Building Institute standard.

The process 1000 includes training or tuning an artificial intelligence model based on the plurality of building datasets to predict compliance of a building dataset with the specific building certification (step 1004), according to some embodiments. In some embodiments, step 1004 is performed by the input controller 602, or more specifically by the AI fine-tuner 812 sand the generative AI 808. Step 1004 may include fine-tuning a neural network or AI by adjusting an architecture (e.g., adding or removing layers, adjusting weights or coefficients of the neural network or artificial intelligence model, etc.) such that the neural network or AI are configured to predict compliance or likelihood of certification of a building corresponding to an input dataset.

The process 1000 includes obtaining, responsive to a user request, a building dataset for a target building for which the specific building certification is desired (step 1006), according to some embodiments. In some embodiments, step 1006 includes obtaining a building dataset provided by a user or building administrator that provides the user request. For example, when a building administrator intends to seek certification of the specific building (e.g., the International WELL Building Institute standard), the building administrator may provide the building data and the request to the verification controller 604 or the input controller 602, with the building data provided as the input data.

The process 1000 includes predicting, using the artificial intelligence model and the building dataset, whether the specific building complies with the specific building certification (step 1008), according to some embodiments. In some embodiments, step 1008 is performed by providing the building dataset as an input to the artificial intelligence model that is trained or tuned in step 1004. In some embodiments, step 1008 is performed by the input controller 602 or the verification controller 604.

The process 1000 includes operating a display screen to notify a user that provides the user request whether the specific building complies with the specific building certification or is likely to be certified (step 1012), according to some embodiments. In some embodiments, step 1012 includes generating and providing a user interface (e.g., the compliance report) that indicates whether the specific building has a high likelihood of being certified by the specific certification that the user that provides the user request desires for the specific building. In some embodiments, step 1012 includes operating the user interface 606 in order to provide the user with the results of step 1008.

The process 1000 includes operating the display screen to provide one or more recommendations of changes to the specific building that increase a likelihood of the specific building being certified (step 1014), according to some embodiments. For example, step 1008 may also include identifying (e.g., by the data compliance manager 720) which portions of the building dataset result in the decreased likelihood of compliance of the specific building with the specific building certification. In some embodiments, step 1008 includes providing notifications regarding which portions of the building data result in reduced likelihood of the specific building achieving the specific building certification, as well as recommendations to improve or reduce the occurrence of such building data. For example, the recommendations may include recommendations to install or adjust operation of one or more disinfection mechanisms of the specific building in order to improve a risk of infection of individuals within the building.

Building Score System

Referring again to FIGS. 6-10, the compliance determination system 600 (e.g., the input controller 602 and/or the verification controller 604) may be configured to perform any of the techniques or functionality of the systems or devices described in U.S. application Ser. No. 17/972,454, filed Oct. 24, 2022, the entire disclosure of which is incorporated by reference herein. For example, the building data obtained by the input controller 602 or provided to the input controller 602 may be one of the data sources shown in FIG. 3 of U.S. application Ser. No. 17/972,454. In some embodiments, the building score generator 318 of U.S. application Ser. No. 17/972,454 is configured to generate scores for one or more buildings at least in part based on the compliance report of the buildings. In some embodiments, the compliance determination system 600 is configured to generate user interfaces similarly to the user interfaces described in U.S. application Ser. No. 17/972,454 in order to illustrate geographic locations of buildings that have a high likelihood of achieving one or more certifications (e.g., the WELL Building certification). The compliance determination system 600 may also or alternatively perform any of the techniques of the systems or devices described in U.S. application Ser. No. 17/972,454 in order to determine one or more facility improvement measures (e.g., step 1014 of process 1000).

Building Design Tool

Referring again to FIGS. 6-8, the compliance determination system 600 may be used in order to train or fine-tune a generative AI model in order to output building designs that comply with one or more of the standards 710. For example, the synthetic data that is output by the generative AI 808 may include building design data including number of rooms, zones, or spaces, sizes of spaces, sizes and capacities of chillers, HVAC units, or other building equipment, and relationships between the building equipment, HVAC units, chillers, etc. In some embodiments, the building design data is used by the condition predictor 708 and/or the data compliance manager 720 to identify if the building design data would result in a building that complies with one or more of the standards 710. The synthetic data may be filtered or feedback can be provided to the input controller 602 in order to adjust or initiate a fine-tuning process of the generative AI 808 such that the generative AI 808 outputs building design data that complies with one or more of the standards 710 (e.g., a subset of the standards 710 selected by a user). In some embodiments, the compliance predictor 708 is a generative AI model (e.g., similar to the generative AI 808) that is configured to use the synthetic data, the input data, or the building design data to predict the conditions that are used by the data compliance manager 720 in order to determine the compliance results. In some embodiments, the condition predictor 708 is an AI that is trained based on a database of building design data and corresponding conditions associated with the building data.

Advantageously, the compliance determination system 600 and the various processes described herein provide a variety of improvements to the functioning of the building system. For example, evaluating the synthetic data generated by generative AI 808 and/or AI models 610 allows the compliance determination system 600 to determine whether the synthetic data correspond to building conditions that comply with various standards or certifications and/or will result in building conditions that comply with various standard or certifications if the synthetic data are used to operate the building equipment 608. Non-compliant synthetic data can be removed from the synthetic data set to generate a filtered synthetic data set which excludes any non-compliant synthetic data. The filtered synthetic data set can then be used to operate the building equipment 608 and/or train or fine-tune one or more predictive models (e.g., AI models 610, state-space models, etc.).

These features allow the compliance determination system 600 to ensure that the building equipment 608 are not provided with synthetic data (e.g., operating commands, setpoints, etc.) that will result in non-compliance with the standards or certifications, and can ensure that the environmental conditions in the building 10 remain compliant with the standards or certifications. The compliance determination system 600 can also ensure that non-compliant synthetic data are not used as training data for various models. This functionality ensures that the models are trained using only compliant data and thus will not learn to replicate or generate model outputs that will result in non-compliance with the standards or certifications. These features allow the building system to leverage the benefits of generative AI (e.g., rapidly generating large amounts of synthetic data) while ensuring that the synthetic data generated by the generative AI are checked for compliance with any standards or certifications of interest before being used for other purposes such as model training, controlling building equipment 608, data analytics, or provided as inputs to other systems or devices.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted.

Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for controlling building equipment, the method comprising:
   generating building data comprising synthetic measurements of one or more conditions of a building space using a generative artificial intelligence model;
   determining whether the building data correspond to conditions in the building space that comply with one or more regulations or certification standards by comparing a value of an environmental condition or an operating parameter for the building equipment of the building data with a threshold for the environmental condition or a threshold for the operating parameter for the building equipment set by the one or more regulations or certifications standards; and
   in response to determining that the building data correspond to conditions of the building space that comply with the one or more regulations or certification standards, using the building data to train another model used to manage or control the building equipment or the building space.

2. The method of claim 1, wherein using the building data to operate the building equipment comprises:
   using the building data to train a predictive model or reinforcement policy; and
   using the predictive model to generate operating parameters for the building equipment.

3. The method of claim 1, further comprising in response to determining that the building data correspond to conditions in the building space that do not comply with the one or more regulations or certification standards:
   filtering the building data to remove one or more portions of the building data that correspond to conditions in the building space that do not comply with the one or more regulations or certification standards; and
   initiating a fine-tuning process of the generative artificial intelligence model based on the filtered building data.

4. The method of claim 1, further comprising:
   generating a compliance report that indicates one or more of a plurality of regulations or certification standards with which the building data comply, the building data including design parameters for a new building; and
   operating a display screen to present the compliance report to a user.

5. The method of claim 1, wherein the one or more regulations or certifications standards comprise one or more comfort standards, one or more emissions standards, one or more American Society of Heating, Refrigerating, and Air-Conditioning Engineers ("ASHRAE") standards, and an International WELL Building Institute standard.

6. The method of claim 1, wherein the building data comprise time-series data of operating conditions of the building equipment over a time period.

7. The method of claim 1, wherein the generative artificial intelligence model is trained based on a database of real-world building data of a plurality of different buildings.

8. A control system for building equipment, the control system comprising:
building equipment that serve a building space; and
processing circuitry configured to:
   generate building data comprising synthetic measurements of one or more conditions of the building space using a generative artificial intelligence model;
   determine whether the building data correspond to conditions in the building space that comply with one or more regulations or certification standards by comparing a value of an environmental condition or an operating parameter for the building equipment of the building data with a threshold for the environmental condition or a threshold for the operating parameter for the building equipment set by the one or more regulations or certifications standards; and
   in response to determining that the building data correspond to conditions of the building space that comply with the one or more regulations or certification standards, using the building data to train another model to manage or control the building equipment or the building space.

9. The control system of claim 8, wherein the processing circuitry is configured to use the building data to operate the building equipment by:
   using the building data to train a predictive model or reinforcement policy; and
   using the predictive model to generate operating parameters for the building equipment.

10. The control system of claim 8, wherein the processing circuitry is further configured to, in response to determining that the building data correspond to conditions in the building space that do not comply with the one or more regulations or certification standards:
    filter the building data to remove one or more portions of the building data that correspond to conditions in the building space that do not comply with the one or more regulations or certification standards; and
    initiate a fine-tuning process of the generative artificial intelligence model based on the filtered building data.

11. The control system of claim 8, wherein the processing circuitry is further configured to:
    generate a compliance report that indicates one or more of a plurality of regulations or certification standards with which the building data comply, the building data including design parameters for a new building; and
    operate a display screen to present the compliance report to a user.

12. The control system of claim 8, wherein the one or more regulations or certifications standards comprise one or more comfort standards, one or more emissions standards, one or more American Society of Heating, Refrigerating, and Air-Conditioning Engineers ("ASHRAE") standards, and an International WELL Building Institute standard.

13. The control system of claim 8, wherein the building data comprise time-series data of operating conditions of the building equipment over a time period.

14. The control system of claim 8, wherein the generative artificial intelligence model is trained based on a database of real-world building data of a plurality of different buildings.

15. A method for controlling building equipment, the method comprising:
    generating building data comprising operating parameters for building equipment using a generative artificial intelligence model;
    predicting a condition of a building space that will result from operating the building equipment according to the operating parameters using a predictive model;

determining whether the condition of the building space complies with one or more regulations or certification standards by comparing the condition of the building space with a threshold set by the one or more regulations or certification standards;

in response to determining that the condition complies with the one or more regulations or certification standards, using the building data to train another model to manage or control the building equipment or the building space.

16. The method of claim 15, wherein using the building data further comprises:

using the building data to train a reinforcement policy; and using the other model to generate operating parameters for the building equipment.

17. The method of claim 15, further comprising in response to determining that the building data correspond to conditions in the building space that do not comply with the one or more regulations or certification standards:

filtering the building data to remove one or more portions of the building data that correspond to conditions in the building space that do not comply with the one or more regulations or certification standards; and initiating a fine-tuning process of the generative artificial intelligence model based on the filtered building data.

18. The method of claim 15, further comprising:

generating a compliance report that indicates one or more of a plurality of regulations or certification standards with which the building data comply, the building data including design parameters for a new building; and operating a display screen to present the compliance report to a user.

19. The method of claim 15, wherein the one or more regulations or certifications standards comprise one or more comfort standards, one or more emissions standards, one or more American Society of Heating, Refrigerating, and Air-Conditioning Engineers ("ASHRAE") standards, and an International WELL Building Institute standard.

20. The method of claim 15, wherein the generative artificial intelligence model is trained based on a database of real-world building data of a plurality of different buildings and wherein the generative artificial intelligence model is a large language model.

* * * * *